(12) United States Patent
Sabouri-Sichani et al.

(10) Patent No.: US 12,464,422 B2
(45) Date of Patent: Nov. 4, 2025

(54) SERVING CELL CHANGE PROCEDURE UTILIZING MULTIPLE CANDIDATE TARGET CELLS

(71) Applicant: Nokia Technologies Oy, Espoo (FI)

(72) Inventors: Faranaz Sabouri-Sichani, Aalborg (DK); Ahmad Awada, Munich (DE); Srinivasan Selvaganapathy, Bangalore (IN); Jing He, Beijing (CN); Amaanat Ali, Espoo (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 370 days.

(21) Appl. No.: 18/026,205

(22) PCT Filed: Sep. 15, 2020

(86) PCT No.: PCT/CN2020/115415
§ 371 (c)(1),
(2) Date: Mar. 14, 2023

(87) PCT Pub. No.: WO2022/056689
PCT Pub. Date: Mar. 24, 2022

(65) Prior Publication Data
US 2023/0370910 A1    Nov. 16, 2023

(51) Int. Cl.
*H04W 36/00* (2009.01)
*H04W 74/0833* (2024.01)

(52) U.S. Cl.
CPC . *H04W 36/0072* (2013.01); *H04W 36/00835* (2018.08); *H04W 74/0833* (2013.01)

(58) Field of Classification Search
CPC ....... H04W 36/0072; H04W 36/00835; H04W 74/0833; H04W 36/18; H04W 36/362
See application file for complete search history.

(56) References Cited

U.S. PATENT DOCUMENTS

2018/0013524 A1  1/2018 Chien et al.
2018/0049092 A1  2/2018 Yamazaki et al.
(Continued)

FOREIGN PATENT DOCUMENTS

CN    102651894 A    8/2012
CN    105052233 A    11/2015
(Continued)

OTHER PUBLICATIONS

Qualcomm Incorporated: "Fast SN Activation in Handover to ENDC", R3-195496, 3GPP TSG-RAN WG3 Meeting #105bis Chongqing, China; Oct. 14-18, 2019, 4 pgs.
(Continued)

*Primary Examiner* — Dinh Nguyen
(74) *Attorney, Agent, or Firm* — Lippes Mathias LLP

(57) ABSTRACT

Embodiments of the present disclosure relate to device, method, apparatus and computer readable storage medium of serving cell change procedure utilizing the multiple candidate target cells. The method comprises receiving, from a second device, configuration information associated with a serving cell change procedure of the first device, the configuration information indicating at least a first candidate cell managed by a third device and a second candidate cell managed by a fourth device available for the serving cell change procedure; performing, during the serving cell change procedure, a first random access procedure to access the first candidate cell and a second random access procedure to access the second candidate cell; and accessing to a target cell determined from the first candidate cell and the second candidate cell after the serving cell change procedure is completed. In this way, the interruption time corresponding to CHO or CPC procedure when multiple candidates are available can be reduced.

19 Claims, 5 Drawing Sheets

(56) References Cited

U.S. PATENT DOCUMENTS

| | | | |
|---|---|---|---|
| 2019/0246323 A1* | 8/2019 | Kim | H04W 36/0058 |
| 2020/0045597 A1 | 2/2020 | Tidestav et al. | |
| 2020/0077310 A1* | 3/2020 | Cheng | H04W 76/27 |
| 2020/0396774 A1* | 12/2020 | Thota | H04W 74/0833 |

FOREIGN PATENT DOCUMENTS

| | | |
|---|---|---|
| CN | 106817696 A | 6/2017 |
| CN | 108370574 A | 8/2018 |
| CN | 109526033 A | 3/2019 |
| CN | 110831082 A | 2/2020 |
| CN | 111200847 | 5/2020 |
| WO | WO 2011/024057 A1 | 3/2011 |
| WO | WO 2018/230997 A1 | 12/2018 |
| WO | WO 2020/164070 A1 | 8/2020 |

OTHER PUBLICATIONS

Qualcomm Incorporated, "LTE Conditional HO failure handling", 3GPP TSG-RAN WG2 Meeting #107, R2-1909878, Prague, Czech Republic Aug. 26-30, 2019, 5 pgs.

PCT ISR, Jun. 16, 2021, 3 pages.

PCT WR OPN, Jun. 16, 2021, 3 pages.

\* cited by examiner

SERVING CELL CHANGE PROCEDURE UTILIZING MULTIPLE CANDIDATE TARGET CELLS

FIELD

Embodiments of the present disclosure generally relate to the field of telecommunication and in particular, to device, method, apparatus and computer readable storage medium of serving cell change procedure utilizing the multiple candidate target cells.

BACKGROUND

In a Conditional Handover (CHO) procedure, a source NR Next Generation NodeB (gNB) may prepare one or more candidate target gNBs available for the CHO based on the measurement performed at the User Equipment (UE), and configures the UE for the handover with at most two triggering conditions along with the configurations of the prepared target cells. Upon detecting failure on conditional HO to the first candidate target gNB which fulfills the condition, the UE is allowed to try a further HO execution if a second candidate target gNB is available. The second CHO execution is done in sequential manner and only after failure of the first CHO execution is failed. As a consequence, it may introduce a delay in successful handover which can result in radio link failure.

To reduce interruption time related to handover in downlink (DL) and uplink (UL), Dual Active Protocol Stack (DAPS) solution has been introduced. Each of the source and target cell has full L2 protocol stack with own security key for ciphering and deciphering of the Packet Data Convergence Protocol (PDCP) Service Data Units (SDUs). To avoid a hard handover causing service interruption, the UE should establish a new radio link with respect to the target cell before detaching the radio link of the source cell. That is, the UE can exchange data with both source and target nodes before the source cell is released. In DAPS, the UE may switch the UL user plane (transmission of new PDCP SDU) to the target cell when random access to the target cell is completed. All other UL signalling, e.g., CSI feedback, PDCP status report, HARQ feedback, continues between the UE and the source cell until it is released.

In a Conditional PSCell Change (CPC) procedure, upon receiving the measurements result from the UE, the source Primary Secondary Cell (PSCell) may prepare one or multiple target PSCells in a Secondary Node (SN) and provide the UE with CPC execution condition along with the configurations of the prepared target PSCells. Once the CPC execution condition is met at the UE, the UE detaches from source PSCell and performs access to a new target PSCell. If the CPC command was configured via Signaling Radio Bearer 1 (SRB1), the UE needs to send RRC Reconfiguration Complete message to the Master Node (MN) when CPC execution condition is met. This is not required if the CPC command is received via SRB3 of SN. Whether the UE continues measurements for candidate PSCells configured for execution condition upon CPC failure is left to the UE implementation. When RLF or HOF is detected for PSCell, S-RLF is detected and UE sends Secondary Cell Group (SCG)-failure information to MN. In a CPC procedure, a source NR Next Generation NodeB (gNB) secondary PCell may prepare one or more candidate target gNBs available for the CPC based on the measurement performed at the User Equipment (UE), and configures the UE for the PSCell change with triggering conditions along with the configurations of the prepared target cells.

A multi-USIM device has two (Dual) or more (Multiple) simultaneous network subscriptions. The MUSIM devices are widely available in the market, especially in the enhanced Mobile Broad Band (eMBB) section. These devices may have limited hardware resources and have to share the same resources at the UE. Hence, the hardware of the multi-USIM device can be multiplexed in order to support services across two or more networks concurrently. The MUSIM devices may make small gaps in their RRC-_connection with one subscription, to support services on another subscription. This interruption can be coordinated with the network.

SUMMARY

In general, example embodiments of the present disclosure provide a solution of the enhancement of CHO procedure or CPC procedure utilizing multiple candidate target cells.

In a first aspect, there is provided a first device. The first device comprises at least one processor; and at least one memory including computer program codes; the at least one memory and the computer program codes are configured to, with the at least one processor, cause the first device at least to receive, from a second device, configuration information associated with a serving cell change procedure of the first device, the configuration information indicating at least a first candidate cell managed by a third device and a second candidate cell managed by a fourth device available for the serving cell change procedure; perform, during the serving cell change procedure, a first random access procedure to access the first candidate cell and a second random access procedure to access the second candidate cell; and access to a target cell determined from the first candidate cell and the second candidate cell after the serving cell change procedure is completed.

In a second aspect, there is provided a method. The method comprises receiving, from a second device, configuration information associated with a serving cell change procedure of the first device, the configuration information indicating at least a first candidate cell managed by a third device and a second candidate cell managed by a fourth device available for the serving cell change procedure; performing, during the serving cell change procedure, a first random access procedure to access the first candidate cell and a second random access procedure to access the second candidate cell; and accessing to a target cell determined from the first candidate cell and the second candidate cell after the serving cell change procedure is completed.

In a third aspect, there is provided an apparatus comprises means for receiving, from a second device, configuration information associated with a serving cell change procedure of the first device, the configuration information indicating at least a first candidate cell managed by a third device and a second candidate cell managed by a fourth device available for the serving cell change procedure; means for performing, during the serving cell change procedure, a first random access procedure to access the first candidate cell and a second random access procedure to access the second candidate cell; and means for accessing to a target cell determined from the first candidate cell and the second candidate cell after the serving cell change procedure is completed.

In a fourth aspect, there is provided a computer readable medium having a computer program stored thereon which, when executed by at least one processor of a device, causes the device to carry out the method according to the second aspect.

Other features and advantages of the embodiments of the present disclosure will also be apparent from the following description of specific embodiments when read in conjunction with the accompanying drawings, which illustrate, by way of example, the principles of embodiments of the disclosure.

BRIEF DESCRIPTION OF THE DRAWINGS

Embodiments of the disclosure are presented in the sense of examples and their advantages are explained in greater detail below, with reference to the accompanying drawings, where.

Throughout the drawings, the same or similar reference numerals represent the same or similar element.

DETAILED DESCRIPTION

Figure 1:
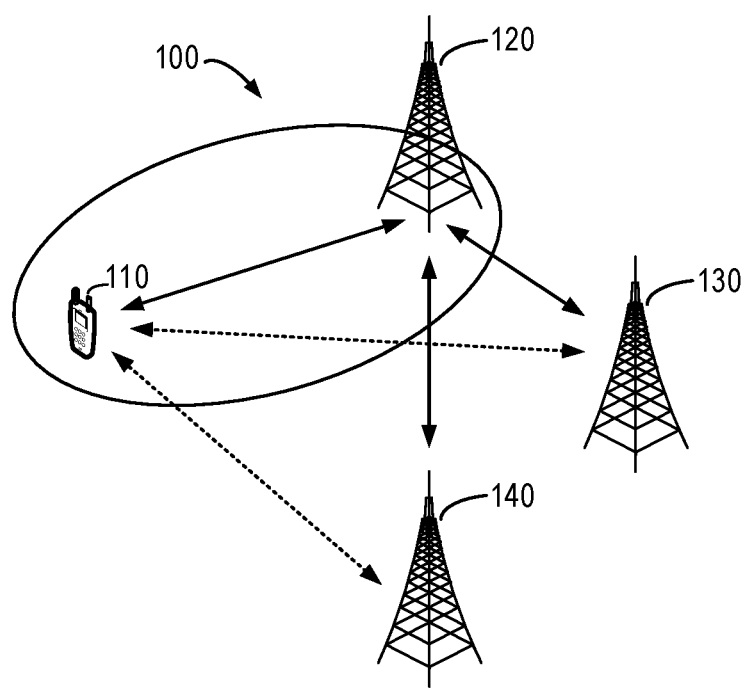
FIG. 1 illustrates an example environment in which example embodiments of the present disclosure can be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish functionalities of various elements. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:
 (a) hardware-only circuit implementations (such as implementations in only analog and/or digital circuitry) and
 (b) combinations of hardware circuits and software, such as (as applicable):
  (i) a combination of analog and/or digital hardware circuit(s) with software/firmware and
  (ii) any portions of hardware processor(s) with software (including digital signal processor(s)), software, and memory(ies) that work together to cause an apparatus, such as a mobile phone or server, to perform various functions) and
 (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as fifth generation (5G) systems, Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the future fifth generation (5G) new radio (NR) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a NR Next Generation NodeB (gNB), a Remote Radio Unit (RRU), a radio header (RH), a remote radio head (RRH), a relay, a low power node such as a femto, a pico, and so forth, depending on the applied terminology and technology. A RAN split architecture comprises a gNB-CU (Centralized unit, hosting RRC, SDAP and PDCP) controlling a plurality of gNB-DUs (Distributed unit, hosting RLC, MAC and PHY). A relay node may correspond to DU part of the IAB node.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. The terminal device may also correspond to Mobile Termination (MT) part of the integrated access and backhaul (IAB) node (a.k.a. a relay node). In the following description, the terms "terminal device", "communication device", "terminal", "user equipment" and "UE" may be used interchangeably.

Although functionalities described herein can be performed, in various example embodiments, in a fixed and/or a wireless network node, in other example embodiments, functionalities may be implemented in a user equipment apparatus (such as a cell phone or tablet computer or laptop computer or desktop computer or mobile IoT device or fixed IoT device). This user equipment apparatus can, for example, be furnished with corresponding capabilities as described in connection with the fixed and/or the wireless network node(s), as appropriate. The user equipment apparatus may be the user equipment and/or or a control device, such as a chipset or processor, configured to control the user equipment when installed therein. Examples of such functionalities include the bootstrapping server function and/or the home subscriber server, which may be implemented in the user equipment apparatus by providing the user equipment apparatus with software configured to cause the user equipment apparatus to perform from the point of view of these functions/nodes.

FIG. 1 shows an example communication network 100 in which embodiments of the present disclosure can be implemented. As shown in FIG. 1, the communication network 100 comprises a terminal device 110 (hereafter also referred to as a first device 110 or a UE 110) and a network device 120 (hereafter also referred to as a second device 120 or a source gNB). The terminal device 110 may communicate with network device 120.

The communication network 100 may also comprise network devices 130 and 140. The network devices 130 and 140 can be considered as neighbor gNBs of the network device 120. The network device 120 can communicate with network devices 130 and 140. For a CHO procedure of the terminal device 110, the network device 120 may prepare at least network devices 130 and 140 and receive configurations from the network devices 130 and 140. Then the network device 120 may provide configuration information for the CHO procedure indicating at least the network devices 130 and 140 as candidate target gNB for the CHO procedure. When the condition of the CHO is met, the terminal device 110 may try to access to one of a candidate target cell of the network device 130 and a candidate target cell of the network device 140 and detach from the network device 120. Therefore, hereinafter the network device 130 may also be referred to as a first candidate target gNB 130 and the network device 140 may also be referred to as a second candidate target gNB 140.

In NR intra-SN scenario, the terminal device 110 may comprise a Master Node (MN) UE and a Secondary Node (SN) UE (not shown in FIG. 1). The network device 120 may comprise a PSCell and the SN UE may access to the PSCell. The PSCell managed by the network device 120 may be referred to as a source PSCell 120. For a CPC procedure, the source PSCell 120 may prepare at least target PSCells 130 and 140 and receive configurations from the target PSCells 130 and 140. Then the source PSCell 120 may provide configuration information for the CPC procedure indicating at least the target PSCells 130 and 140 as candidate target gNB for the CHO procedure. Therefore, hereinafter the network device 130 may also be referred to as a first candidate target PSCell 130 and the network device 140 may also be referred to as a second candidate target PSCell 140.

It is to be understood that the number of network devices and terminal devices shown in FIG. 1 is given for the purpose of illustration without suggesting any limitations. The communication network 100 may include any suitable number of network devices and terminal devices.

Depending on the communication technologies, the network 100 may be a Code Division Multiple Access (CDMA) network, a Time Division Multiple Address (TDMA) network, a Frequency Division Multiple Access (FDMA) network, an Orthogonal Frequency-Division Multiple Access (OFDMA) network, a Single Carrier-Frequency Division Multiple Access (SC-FDMA) network or any others. Communications discussed in the network 100 may conform to any suitable standards including, but not limited to, New Radio Access (NR), Long Term Evolution (LTE), LTE-Evolution, LTE-Advanced (LTE-A), Wideband Code Division Multiple Access (WCDMA), Code Division Multiple Access (CDMA), cdma2000, and Global System for Mobile Communications (GSM) and the like. Furthermore, the communications may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G) communication protocols. The techniques described herein may be used for the wireless networks and radio technologies mentioned above as well as other wireless networks and radio technologies. For clarity, certain aspects of the techniques are described below for LTE, and LTE terminology is used in much of the description below.

In general, for CHO or CPC, the source cell, i.e. a PCell or a PSCell, may identify one or more suitable neighbouring cells as candidate target PCells/PSCells. The source cell may prepare multiple target cells and configure the UE for CHO or CPC, i.e., a UE may be configured with conditions for more than one CHO or CPC by gNB.

If more than one target PCells for CHO or target PSCells for CPC are prepared and both meet the conditions, in the conventional way, the UE may detach from the source cell and initiate CHO/CPC execution to the first candidate target cell. The UE may try to execute the second candidate cell only when the initiated CHO/CPC execution to the first candidate target cell fails. Therefore, the interruption time is prolonged by performing a subsequent access to another prepared target cell.

Therefore, the present disclosure proposes a solution of serving cell change procedure utilizing the multiple candidate target cells. In this solution, when the condition of the handover or PSCell change is met and the UE is configured with multiple candidate target cells available for the handover or PSCell change procedure, the UE may initiate random access procedures to at least two candidate target cells and completes access to only one of them. In this way, the interruption time corresponding to CHO or CPC procedure can be reduced in case the access to the first target candidate fails and when multiple candidates are available.

Figure 2:
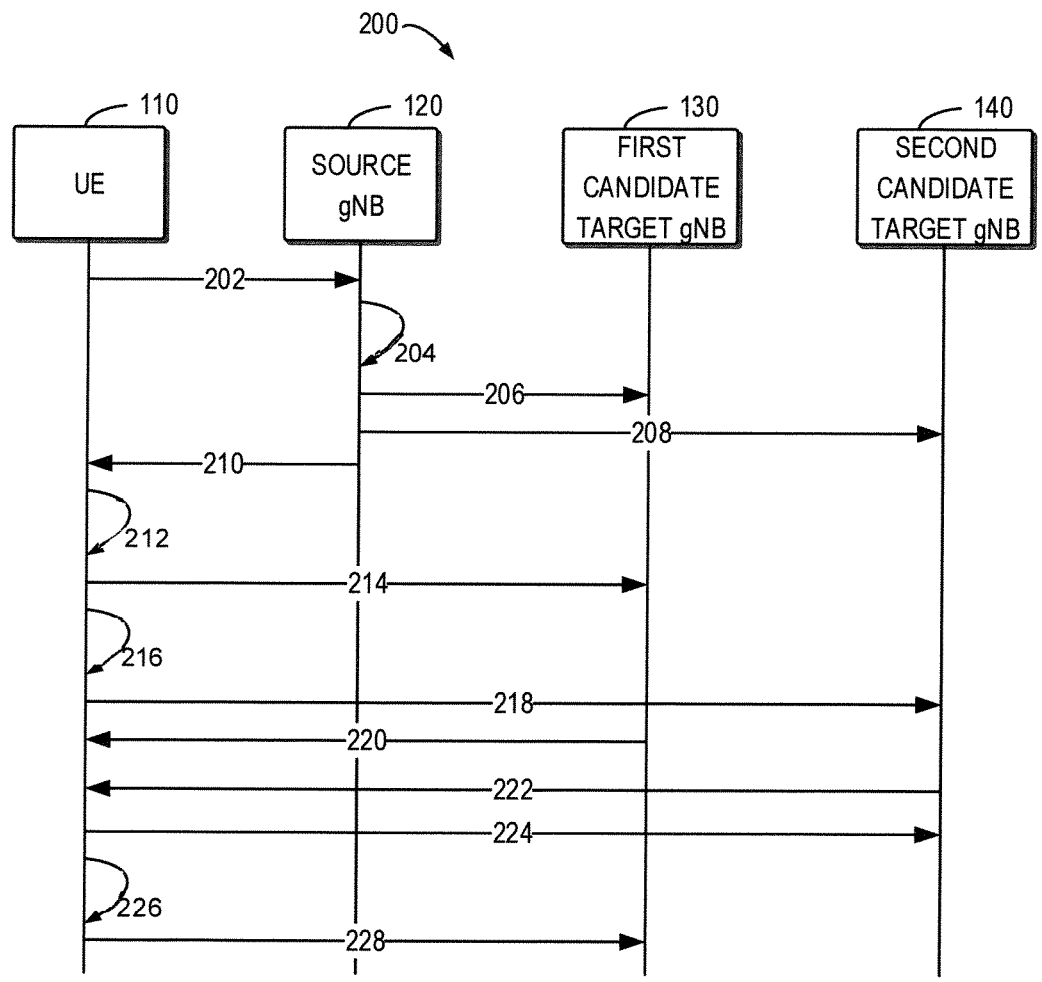
FIG. 2 shows a signaling chart illustrating a process of serving cell change procedure utilizing the multiple candidate target cells for conditional handover according to some example embodiments of the present disclosure.

Principle and implementations of the present disclosure will be described in detail below with reference to FIGS. 2-5. FIG. 2 shows a signaling chart illustrating a process 200 of conditional handover procedure utilizing the multiple candidate target cells according to some example embodiments of the present disclosure. The process 200 may involve the UE 110, the source gNB 120, the first candidate target gNB 130 and the second candidate target gNB 140. For the purpose of discussion, the process 200 will be described with reference to FIG. 1.

As shown in FIG. 2, the UE 110 may perform measurements based on the measurement configuration configured by the source gNB 120 and transmit 202 the measurement report to the source gNB 120 periodically or when the trigger for reporting the measurement report is met. Based on measurement report from the UE 110, the source gNB may determine 204 one or more candidate target gNBs for handover procedure of the UE 110.

The source gNB 120 may transmit 206, for example, a handover request to a first candidate target gNB 130 which may prepare a candidate target cell for the UE 110 to access. The source gNB 120 may also transmit 208, for example, a handover request to a second candidate target gNB 140, which may prepare a further candidate target cell for the UE 110 to access. Correspondingly, the first candidate target gNB 130 and the second candidate target gNB 140 may also configure the related admission control information for the handover request and transmit a handover acknowledgement to the source gNB 120.

The source gNB 120 may obtain the configuration information associated with the handover procedure of the UE 110 from the candidate target gNBs. The configuration information may indicate at least the candidate target cell provided by the first candidate target gNB 130 and the further candidate target cell provided by the second candidate target gNB 140. The source gNB 120 may also configure the UE for HO with at most two triggering conditions along with the configuration information of the candidate target cells prepared for the UE 110. Then the source gNB 120 may transmit 210 the configuration information and the triggering condition to the UE 110.

If the UE 110 determines the triggering condition is met for the first candidate target cell, i.e. the candidate target cell provided by the first candidate target gNB 130, the UE 110 may detach 212 from source gNB. Furthermore, the UE 110 may initiate a first random access procedure to access the first candidate target cell based on the configuration. For initiating the first random access procedure, the UE 110 may transmit 214 a Random Access Channel (RACH) preamble to the first candidate target gNB 130.

If the UE 110 determines the triggering condition is met for the second candidate target cell, i.e. the candidate target cell provided by the second candidate target gNB 140, the UE 110 may also create 216 a second PS instance with the configuration of the second candidate target cell and initiate a second random access procedure to access the second candidate target cell based on the configuration. For initiating the second random access procedure, the UE 110 may transmit 218 a RACH preamble to the second candidate target gNB 140.

In some example embodiments, the second random access procedure can be initiated at the same time when the first random access procedure is initiated, if the triggering condition is met for the second candidate target cell.

As an example embodiment, the second random access procedure can also be initiated after a predefined time interval. For example, after the first random access procedure is initiated, a timer will start. This timer has a time duration T less than the duration of timer T304 used for handover failure. If a Random Access Response (RAR) for ($1^{st}$ or nth RACH trial) of the first random access procedure is not received by the UE 110 when the timer T expires, the second random access procedure can be initiated immediately.

If the RAR for the first random access procedure is not received by the UE 110 and the RAR for the second random access procedure has been received by the UE 110, the UE 110 may access to the second candidate target cell.

If the UE 110, for example, as shown in FIG. 2, receives 220 the RAR for the first random access procedure, the UE 110 may access to the first candidate target cell. Then the UE 110 may release the initiated second random access procedure. For example, the UE 110 may stop the second random access procedure to the second candidate target cell when the UE 110 receives the RAR for the first random access procedure. Upon successful access to first candidate target cell, the source gNB 120 will cancel the CHO preparation at second candidate target gNB 140.

If the UE 110, for example, as shown in FIG. 2, also receive 222 the RAR for the second random access procedure, the UE may determine resources granted for the UE 110 from this RAR and transmit 224 a message for releasing the second random access procedure, for example, the message "Release-config" via the granted resources to the second candidate target gNB 140.

The second candidate target gNB 140 may release the prepared configuration upon the reception of the message "Release-config". In some example embodiments, the second candidate target gNB 140 may also release the prepared configuration when a response from the UE is not received within a predefined time interval.

It is also possible that the UE 110 may release the initiated second random access procedure when a RAR for the second random access procedure is not received by the UE 110 within predefined time interval.

After the second random access procedure is released, the UE 110 may release 226 the created second PS instance and transmit 228 a message "RRC Reconfiguration Complete" to the first candidate target gNB 140.

In some example embodiments, if the UE 110 is a single RX/TX device, the resources may be time multiplexed across the first random access procedure and the second random access procedure.

For example, in a case of the synchronized candidate target gNBs, the TDM pattern for the UE 110 may be negotiated with the network. That is, the UE 110 may use the TDM pattern to initiate the first random access procedure and the second random access procedure.

Alternatively, the UE 110 may not apply the full configuration of the candidate target cells. For example, the UE 110 may use the RACH configuration from both the first candidate target cell and the second candidate target cell for initiating RACH access only. Then the UE 110 may apply the full configuration of the candidate target cell for which the RACH Access is completed first. If there is issue in applying part of RRC reconfiguration message (i.e. RACH part)/complete RRC reconfiguration message (including higher layers), the UE needs to trigger re-establishment. If the full configuration is validated in advance, this issue could be avoided.

Figure 3:
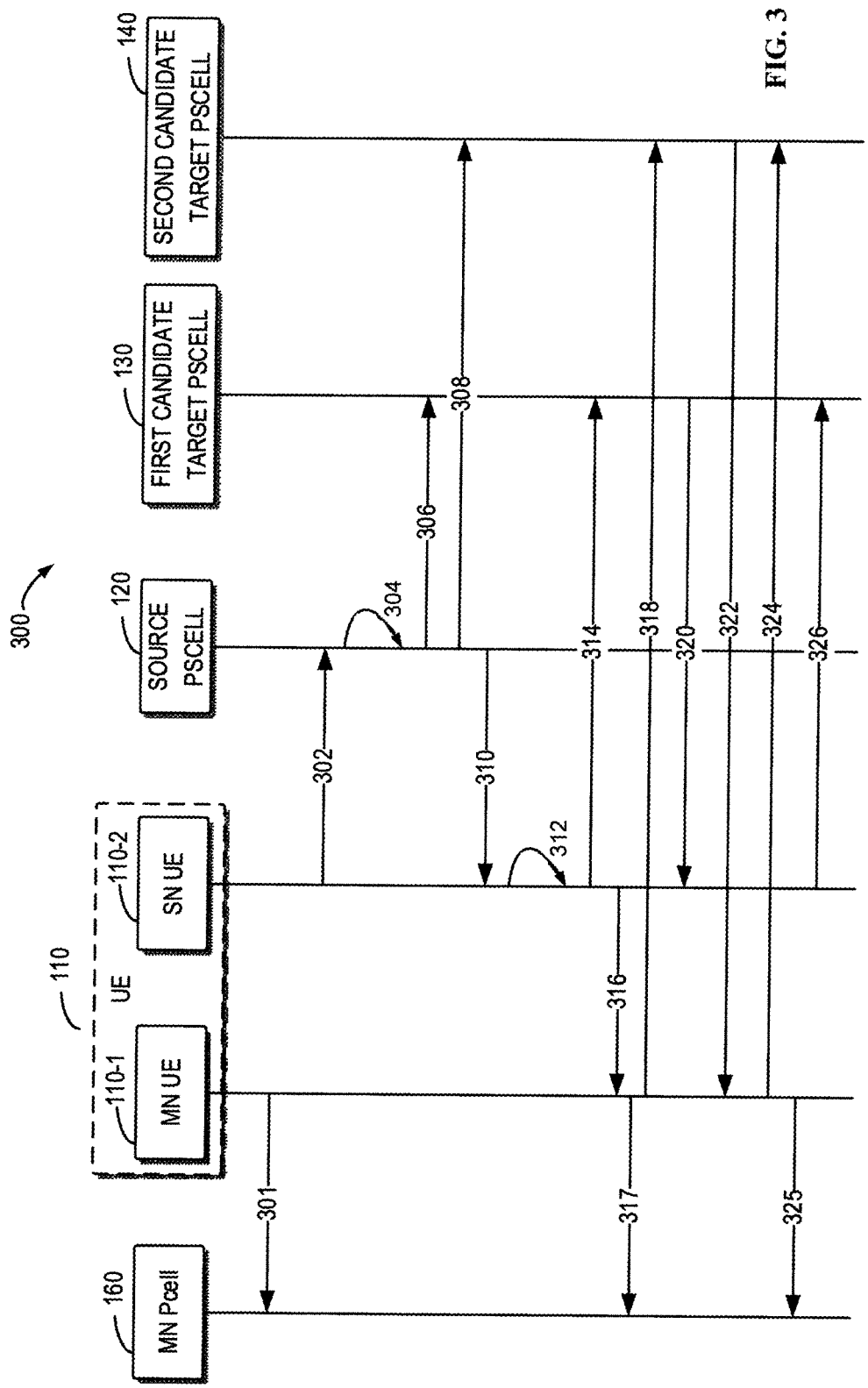
FIG. 3 shows a signaling chart illustrating a process of serving cell change procedure utilizing the multiple candidate target cells for conditional PSCell change according to some example embodiments of the present disclosure.

As mentioned above, the solution proposed in the present disclosure can also be implemented for CPC procedure. FIG. 3 shows a signaling chart illustrating a process 300 of PSCell change procedure utilizing the multiple candidate target cells according to some example embodiments of the present disclosure. The process 300 may involve the UE 110, which may comprise a MN UE 110-1 and a SN UE 110-2, the source PSCell 120, the first candidate target PSCell 130 and the second candidate target PSCell 140. For the purpose of discussion, the process 300 will be described with reference to FIG. 1.

Based on the existing mechanisms for MUSIM operation, the MN UE 110-1 may transmit 301 a message "UEassistanceinformation" to the MN PCell 160. The MN UE 110-1 and the corresponding serving cell in MN (PCell) 160 may have agreed on communication gaps (start/stop, or predefined duration). Alternatively, the MN UE 110-1 may negotiate 301 a TDM pattern with the network. When the configured gaps or TDM pattern is enabled, the gaps or TDM pattern may define the UE's availability multiplexed between MN service and another communication with different cell.

As shown in FIG. 3, the UE 110 may perform measurements based on the measurement configuration configured by the source PSCell 120 and transmit 302 the measurement report to the source PSCell 120 periodically or when the trigger for reporting the measurement report is met. Based on measurement report from the UE 110, the source PSCell may determine 304 one or more candidate target PSCell for CPC procedure of the UE 110.

For example, the source PSCell 120 may transmit 306, for example, request SN addition to a first candidate target PSCell 130. The target PSCells may be in same or different SN. Furthermore, in the example shown in the figure this request is transmitted from source PSCell but it can also be directed via MN/PCell 160. The source PSCell 120 may also transmit 308, for example, request for handover and admission control information to a second candidate target PSCell 140. Correspondingly, the first candidate target PSCell 130 and the second candidate target PSCell 140 may also transmit, for example, a handover acknowledgement, to the source PSCell 120.

The source PSCell 120 may obtain the configuration information associated with the CPC procedure of the UE 110 from candidate target PSCells. The configuration information may indicate at least the candidate target PSCell 130 and the further candidate target PSCell 140. The source gNB 120 may also configure the UE 110 for PSCell change along with the configuration information of the candidate target PSCell prepared for the UE 110. Then the source PSCell 120 may transmit 310 the configuration information and the triggering condition to the UE 110.

If the UE 110 determines the triggering condition is met for the first candidate target PSCell, the UE 110 may detach 312 from source PSCell and initiate a first random access procedure to access the first candidate target PSCell by using resource of SN UE 110-2. For initiating the first random access procedure, the UE 110 may transmit 314 a Random Access Channel (RACH) preamble to the first candidate target PSCell 130.

If the UE 110 determines the triggering condition is met for the second candidate target PSCell, the UE 110 may request resource from the MN UE 110-1 and initiate a second random access procedure to access the second candidate target PSCell by using the requested resources. Before the second random access procedure is initiated, the MN UE 110-1 may ask 317 its MN PCell 160 to suspend its activity. For initiating the second random access procedure, the UE 110 may transmit 318 a RACH preamble to the second candidate target PSCell 140.

In some example embodiments, the second random access procedure can be initiated at the same time when the first random access procedure is initiated if the triggering condition is met for the second candidate target PSCell.

As an example embodiment, the second random access procedure can also be initiated after a predefined time interval. For example, after the first random access procedure is initiated, a timer will start. This timer has a time duration T less than the duration of timer T304 used for handover failure. If a Random Access Response (RAR) for ($1^{st}$ or nth RACH trial) of the first random access procedure is not received by the UE 110 when the timer T expires, the second random access procedure can be initiated immediately.

If the RAR for the first random access procedure is not received by the UE 110 and the RAR for the second random access procedure has been received by the UE 110, the UE 110 may access to the second candidate target PSCell.

If the UE 110, for example, as shown in FIG. 3, receives 320 the RAR for the first random access procedure, the UE 110 may access to the first candidate target PSCell. Then the UE 110 may release the initiated second random access procedure. For example, the UE 110 may stop the second random access procedure to the second candidate target cell when the UE 110 receives the RAR for the first random access procedure. Upon successful access to first candidate target PSCell 130, the source PSCell 120 will cancel the CPC preparation at second candidate target PSCell 140.

If the UE 110, for example, as shown in FIG. 3, also receive 322 the RAR for the second random access procedure, the UE may determine resources granted for the UE 110 from this RAR and transmit 324 a message for releasing the second random access procedure, for example, the message "Release-config" via the granted resources to the second candidate target PSCell 140.

The second candidate target PSCell 140 may release the prepared configuration upon the reception of the message "Release-config". In some example embodiments, the second candidate target PSCell 140 may also release the prepared configuration when a response from the UE is not received within a predefined time interval.

It is also possible that the UE 110 may release the initiated second random access procedure when a RAR for the second random access procedure is not received by the UE 110 within predefined time interval.

After the second random access procedure is released, the UE may resume 325 its connection to the MN PCell 160 and transmit 326 a message "RRC Reconfiguration Complete" to the first candidate target gNB 140.

Figure 4:
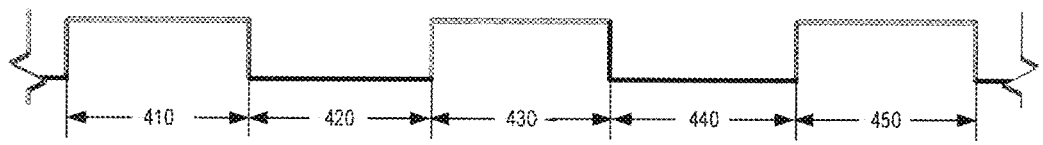
FIG. 4 shows an example of Time Division Multiplex (TDM) pattern according to some example embodiments of the present disclosure.

In some example embodiments, when the hardware of the UE and PS resources are shared across two connection, for example, between MN and SN's RACH access procedure to access a target PSCell, a TDM pattern can be applied for multiplexing the resources. FIG. 4 shows an example of TDM pattern according to some example embodiments of the present disclosure. As shown in FIG. 4, for example, in the time intervals 410, 430 and 450, the MN UE resources can serve MCG, while in the time intervals 420 and 440, the MN UE resources can serve PSCell.

For example, the TDM pattern can be configured in coordination with network. The network. may configure a TDM pattern for MCG leg. The UE may use the TDM pattern to access the second candidate target PSCell, as shown in FIG. 3, via MN UE's resources only during the time it needs to access this the second candidate target PSCell.

The TDM pattern may need to be passed to candidate target PSCell in CPC preparation, to align timing scheduling between PCell and candidate target PSCell when it is enabled for RACH access. For example, the UE can request PCell to activate the TDM pattern in PCell when it starts RACH access to second candidate target PSCell. The UE may request from the PCell to stop working with the TDM patterns once the RACH access to target PSCell is completed. The PCell can reject the request of the UE to activate the TDM pattern or deactivate TDM pattern during the time of MN UE resources serving critical MCG activity.

Alternatively, similar with the TDM pattern, a gap can be configured in coordination with the network. The network may allow the UE to make autonomous gap, i.e. a gap start/end rather than a predefined pattern. The UE may inform the PCell when a gap (e.g. Gap start flag) is expected. The network may suspend PCell and starts a timer for associated with the gap. The UE may start the timer as well and retune its MN resources for RACH access to candidate target PSCell. The gap may end when the UE informs gap stop or the timer expires. The network may also reject a gap-start.

As another option, the discontinuous reception (DRX) approach can also be configured. At each DRX cycle, the UE may monitor PDCCH for any PDSCH or CG and transmit its UL control and data. It starts an inactivity timer when all its DL/UL control and scheduled traffic are completed and goes to sleep after the timer expires. For example, the UE may apply its sleep time at MN for RACH access to second candidate target PSCell. In this case, the DRX may be enabled only when needed with one extra indication in the DRX configuration.

In this way, for both CHO and CPC procedure, the interruption time can be reduced when multiple candidates are available.

Figure 5:
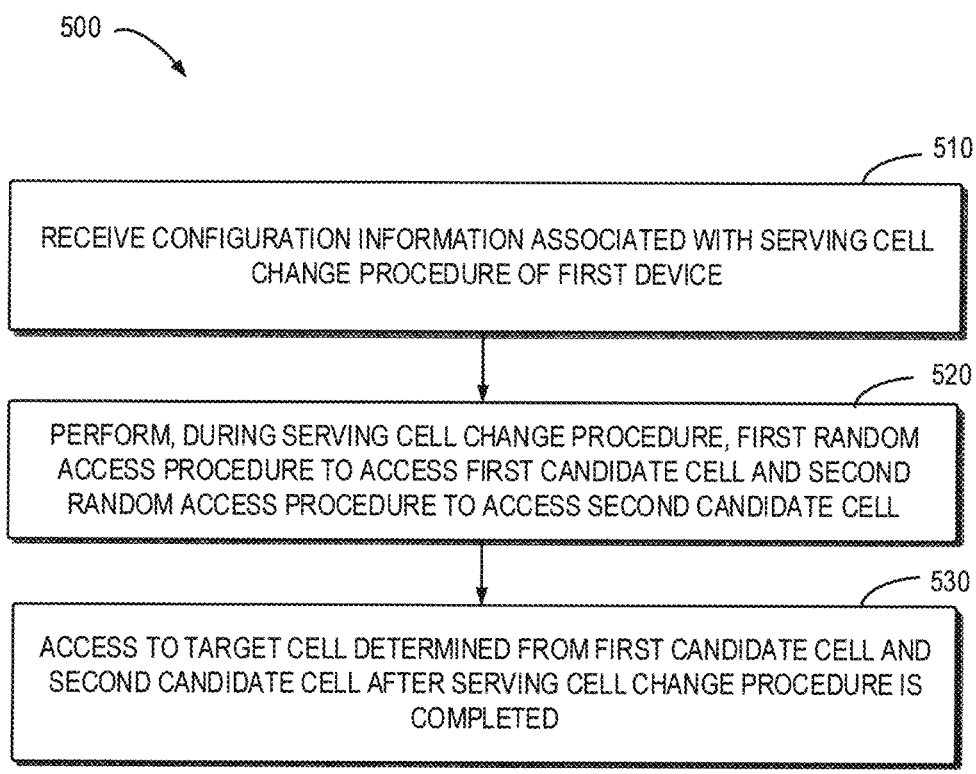
FIG. 5 shows a flowchart of an example method of relative phase determination for frequency drift compensation according to some example embodiments of the present disclosure.

FIG. 5 shows a flowchart of an example method 500 of serving cell change procedure utilizing the multiple candidate target cells according to some example embodiments of the present disclosure. The method 500 can be implemented at the first device 110 as shown in FIG. 1. For the purpose of discussion, the method 500 will be described with reference to FIG. 1.

At 510, the first device receives, from a second device, configuration information associated with a serving cell change procedure of the first device, the configuration information indicating at least a first candidate target cell managed by a third device and a second candidate target cell managed by a fourth device available for the procedure.

At 520, the first device performs, during the serving cell change procedure, a first random access procedure to access the first candidate cell and a second random access procedure to access the second candidate cell.

In some example embodiments, the first device may perform the first random access procedure and the second random access procedure simultaneously.

In some example embodiments, the first device may determine whether a first random access response of the first random access procedure is received by the first device within a first time interval, the first time interval being shorter than a second time interval configured by the second device for indicating a failure in the serving cell change procedure. If the first device determines the first random access response is not received within the first time interval, the first device may perform the second random access procedure.

At 530, the first device accesses to a target cell determined from the first candidate target cell and the second candidate target cell after the serving cell change procedure is completed.

In some example embodiments, if the first device determines a first random access response of the first random access procedure is not received and a second random access response of the second random access procedure has been received by the first device, the first device may complete the access the second candidate cell.

In some example embodiments, if the first device determines both a first random access response of the first random access procedure and a second random access response of the second random access procedure have been received by the first device and the first candidate target cell is selected as the target cell, the first device may complete the access the first candidate cell.

In some example embodiments, if the first device determines the first device is to be accessed to the first candidate cell, the first device may release the second random access procedure.

In some example embodiments, if the first device determines a first random access response to the first random access procedure has been received by the first device, the first device may release the second random access procedure.

In some example embodiments, if the first device determines a second random access response of the second random access procedure has been received by the first device, the first device may determine resources granted for the first device from the second random access response and transmit, to the fourth device, a message for releasing the second random access procedure via the resources.

In some example embodiments, the first device may determine whether a second random access response of the second random access procedure is received by the first device within a third time interval configured for the first device to receive the second random access response. If the first device determines a second message is not received within the third time interval, the first device may release the second random access procedure.

In some example embodiments, the first device comprises a terminal device, the second device comprises a network device, the third device comprises a network device and the fourth device comprises a network device.

In some example embodiments, an apparatus capable of performing the method 500 (for example, implemented at the first device 110) may comprise means for performing the respective steps of the method 500. The means may be implemented in any suitable form. For example, the means may be implemented in a circuitry or software module.

In some example embodiments, the apparatus comprises means for receiving, from a second device, configuration information associated with a serving cell change procedure of the first device, the configuration information indicating at least a first candidate cell managed by a third device and a second candidate cell managed by a fourth device available for the serving cell change procedure; means for performing, during the serving cell change procedure, a first random access procedure to access the first candidate cell and a second random access procedure to access the second candidate cell; and means for accessing to a target cell determined from the first candidate cell and the second candidate cell after the serving cell change procedure is completed.

Figure 6:
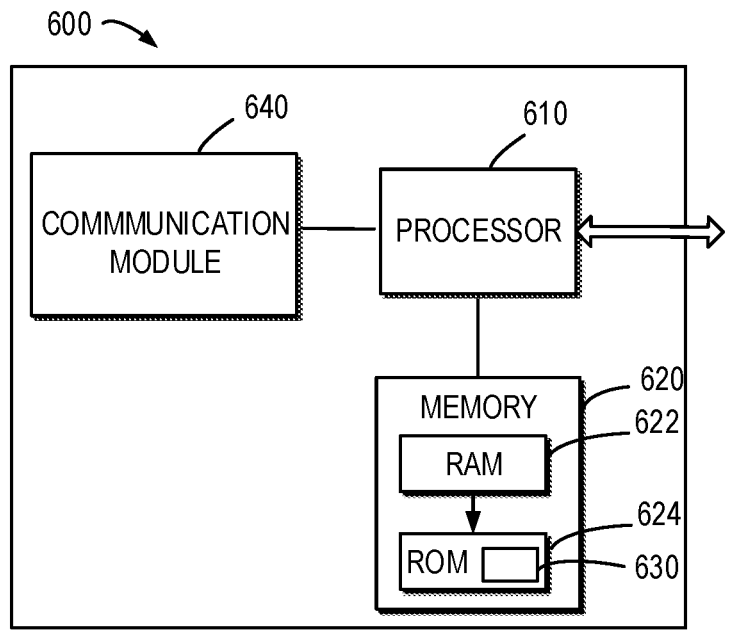
FIG. 6 shows a simplified block diagram of a device that is suitable for implementing example embodiments of the present disclosure.

FIG. 6 is a simplified block diagram of a device 600 that is suitable for implementing embodiments of the present disclosure. The device 600 may be provided to implement the communication device, for example the terminal device 110 as shown in FIG. 1. As shown, the device 600 includes one or more processors 610, one or more memories 620 coupled to the processor 610, and one or more transmitters and receivers (TX/RX) 640 coupled to the processor 610.

The TX/RX 640 is for bidirectional communications. The TX/RX 640 has at least one antenna to facilitate communication. The communication interface may represent any interface that is necessary for communication with other network elements.

The processor 610 may be of any type suitable to the local technical network and may include one or more of the following: general purpose computers, special purpose computers, microprocessors, digital signal processors (DSPs) and processors based on multicore processor architecture, as non-limiting examples. The device 600 may have multiple processors, such as an application specific integrated circuit chip that is slaved in time to a clock which synchronizes the main processor.

The memory 620 may include one or more non-volatile memories and one or more volatile memories. Examples of the non-volatile memories include, but are not limited to, a Read Only Memory (ROM) 624, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 622 and other volatile memories that will not last in the power-down duration.

A computer program 630 includes computer executable instructions that are executed by the associated processor 610. The program 630 may be stored in the ROM 620. The processor 610 may perform any suitable actions and processing by loading the program 630 into the RAM 620.

The embodiments of the present disclosure may be implemented by means of the program 630 so that the device 600 may perform any process of the disclosure as discussed with reference to FIGS. 2-5. The embodiments of the present disclosure may also be implemented by hardware or by a combination of software and hardware.

Figure 7:
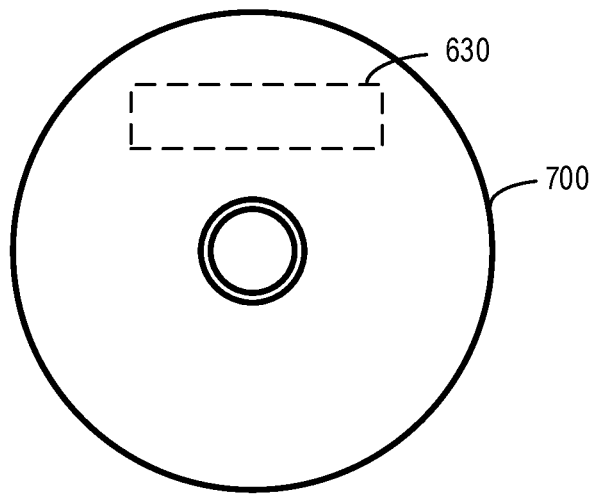
FIG. 7 shows a block diagram of an example computer readable medium in accordance with some embodiments of the present disclosure.

In some embodiments, the program 630 may be tangibly contained in a computer readable medium which may be included in the device 600 (such as in the memory 620) or other storage devices that are accessible by the device 600. The device 600 may load the program 630 from the computer readable medium to the RAM 622 for execution. The computer readable medium may include any types of tangible non-volatile storage, such as ROM, EPROM, a flash memory, a hard disk, CD, DVD, and the like. FIG. 7 shows an example of the computer readable medium 700 in form of CD or DVD. The computer readable medium has the program 630 stored thereon.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, device, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the method 500 as described above with reference to FIG. 5. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing device, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, device or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, device, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A first device comprising:
   at least one processor; and
   at least one memory including computer program codes;
   the at least one memory and the computer program codes are configured to, with the at least one processor, cause the first device at least to:
   receive, from a second device, configuration information associated with a serving cell change procedure of the first device, the configuration information indicating at least a first candidate cell managed by a third device and a second candidate cell managed by a fourth device available for the serving cell change procedure;
   perform, during the serving cell change procedure, a first random access procedure to access the first candidate cell and a second random access procedure to access the second candidate cell; and
   access to a target cell determined from the first candidate cell and the second candidate cell after the serving cell change procedure is completed,
   wherein the first device is caused to perform the first random access procedure and the second random access procedure by:
   determining whether a first random access response of the first random access procedure is received by the first device within a first time interval, the first time interval being shorter than a second time interval configured by the second device for indicating a failure in the serving cell change procedure; and
   in accordance with a determination that the first random access response is not received within the first time interval, performing the second random access procedure.

2. The first device of claim 1, wherein the serving cell change procedure comprises at least one of the following:
   a handover of a primary cell of the first device, and
   a change of a secondary primary cell of the first device.

3. The first device of claim 1, wherein the first device is caused to access to the target cell by:
   in accordance with a determination that a first random access response of the first random access procedure is not received and a second random access response of the second random access procedure has been received by the first device, completing the access to the second candidate cell.

4. The first device of claim 1, wherein the first device is caused to access to the target cell by:
   in accordance with a determination that both a first random access response of the first random access procedure and a second random access response of the second random access procedure have been received by the first device and the first candidate cell is selected as the target cell, completing the access to the first candidate cell.

5. The first device of claim 1, wherein the first device is further caused to:
   in accordance with a determination that the first device is to be accessed to the first candidate target cell, release the second random access procedure.

6. The first device of claim 5, wherein the first device is caused to release the second random access procedure by:
   in accordance with a determination that a first random access response to the first random access procedure has been received by the first device, releasing the second random access procedure.

7. The first device of claim 5, wherein the first device is caused to release the second random access procedure by:
   in accordance with a determination that a second random access response of the second random access procedure has been received by the first device, determining resources granted for the first device from the second random access response; and
   transmitting, to the fourth device, a message for releasing the second random access procedure via the resources.

8. The first device of claim 5, wherein the first device is caused to release the second random access procedure by:
   determining whether a second random access response of the second random access procedure is received by the first device within a third time interval configured for the first device to receive the second random access response; and
   in accordance with a determination that a second message is not received within the third time interval, releasing the second random access procedure.

9. The first device of claim 1, wherein the first device comprises a terminal device, the second device comprises a network device, the third device comprises a network device and the fourth device comprises a network device.

10. A method comprising:
    receiving, from a second device, configuration information associated with a serving cell change procedure of the first device, the configuration information indicating at least a first candidate cell managed by a third device and a second candidate cell managed by a fourth device available for the serving cell change procedure;

performing, during the serving cell change procedure, a first random access procedure to access the first candidate cell and a second random access procedure to access the second candidate cell; and accessing to a target cell determined from the first candidate cell and the second candidate cell after the serving cell change procedure is completed, wherein performing the first random access procedure and the second random access procedure comprises:

determining whether a first random access response of the first random access procedure is received by the first device within a first time interval, the first time interval being shorter than a second time interval configured by the second device for indicating a failure in the serving cell change procedure; and in accordance with a determination that the first random access response is not received within the first time interval, performing the second random access procedure.

11. The method of claim 10, wherein the serving cell change procedure comprises at least one of the following:
a handover of a primary cell of the first device, and
a change of a secondary primary cell of the first device.

12. The method of claim 10, wherein accessing to the target cell comprises:
in accordance with a determination that a first random access response of the first random access procedure is not received and a second random access response of the second random access procedure has been received by the first device, completing the access to the second candidate cell.

13. The method of claim 10, wherein accessing to the target cell comprises:
in accordance with a determination that both a first random access response of the first random access procedure and a second random access response of the second random access procedure have been received by the first device and the first candidate cell is selected as the target cell, completing the access to the first candidate cell.

14. The method of claim 10, further comprising:
in accordance with a determination that the first device is to be accessed to the first candidate cell, releasing the second random access procedure.

15. The method of claim 14, wherein releasing the second random access procedure comprises:
in accordance with a determination that a first random access response to the first random access procedure has been received by the first device, releasing the second random access procedure.

16. The method of claim 14, wherein releasing the second random access procedure comprises:
in accordance with a determination that a second random access response of the second random access procedure has been received by the first device, determining resources granted for the first device from the second random access response; and
transmitting, to the fourth device, a message for releasing the second random access procedure via the resources.

17. The method of claim 14, wherein releasing the second random access procedure comprises:
determining whether a second random access response of the second random access procedure is received by the first device within a third time interval configured for the first device to receive the second random access response; and
in accordance with a determination that a second message is not received within the third time interval, releasing the second random access procedure.

18. The method of claim 10, wherein the first device comprises a terminal device, the second device comprises a network device, the third device comprises a network device and the fourth device comprises a network device.

19. A non-transitory computer readable medium comprising program instructions stored thereon to perform at least:
receiving, from a second device, configuration information associated with a serving cell change procedure of a first device, the configuration information indicating at least a first candidate cell managed by a third device and a second candidate cell managed by a fourth device available for the serving cell change procedure;
performing, during the serving cell change procedure, a first random access procedure to access the first candidate cell and a second random access procedure to access the second candidate cell; and
accessing to a target cell determined from the first candidate cell and the second candidate cell after the serving cell change procedure is completed,
wherein performing the first random access procedure and the second random access procedure comprises:
determining whether a first random access response of the first random access procedure is received by the first device within a first time interval, the first time interval being shorter than a second time interval configured by the second device for indicating a failure in the serving cell change procedure; and
in accordance with a determination that the first random access response is not received within the first time interval, performing the second random access procedure.

* * * * *